United States Patent
Shundo et al.

(10) Patent No.: US 10,787,244 B2
(45) Date of Patent: Sep. 29, 2020

(54) SEMI-AUTOMATIC ROTOR BLADE FOLD MECHANISM

(71) Applicant: Bell Helicopter Textron Inc., Fort Worth, TX (US)

(72) Inventors: Ken Shundo, Keller, TX (US); Glenn Alan Shimek, Kennedale, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 95 days.

(21) Appl. No.: 16/011,721

(22) Filed: Jun. 19, 2018

(65) Prior Publication Data

US 2019/0382100 A1 Dec. 19, 2019

(51) Int. Cl.
*B64C 11/28* (2006.01)
*B64C 27/50* (2006.01)
*B64C 11/04* (2006.01)
*B64C 27/02* (2006.01)

(52) U.S. Cl.
CPC .............. *B64C 11/28* (2013.01); *B64C 11/04* (2013.01); *B64C 27/50* (2013.01); *B64C 27/022* (2013.01)

(58) Field of Classification Search
CPC ....... B64C 27/022; B64C 27/50; B64C 11/04; B64C 11/16; B64C 11/20; B64C 11/28; F16C 11/04
USPC ........ 416/142; 384/192, 217, 222, 282, 275, 384/435
See application file for complete search history.

(56) References Cited

U.S. PATENT DOCUMENTS

| | | | | |
|---|---|---|---|---|
| 1,020,552 A | * | 3/1912 | Henry | F16C 17/10 384/275 |
| 3,135,333 A | * | 6/1964 | Cruz | B64C 27/50 416/143 |
| 3,749,515 A | * | 7/1973 | Covington | B64C 27/50 416/143 |
| 4,652,210 A | * | 3/1987 | Leman | B64C 27/322 416/134 A |
| 4,985,675 A | * | 1/1991 | Turudic | G01R 31/2805 324/538 |
| 5,074,753 A | * | 12/1991 | Covington | B64C 27/48 416/141 |
| 6,061,870 A | * | 5/2000 | Dodge | A63C 10/04 16/2.1 |
| 2005/0125946 A1 | * | 6/2005 | Sucic | B64C 27/32 16/2.1 |
| 2011/0253182 A1 | * | 10/2011 | Isenberg | F16C 35/073 134/198 |
| 2012/0087797 A1 | * | 4/2012 | Kuntze-Fechner | B64C 27/33 416/220 A |

* cited by examiner

*Primary Examiner* — Christopher Verdier
*Assistant Examiner* — Elton K Wong
(74) *Attorney, Agent, or Firm* — Shackelford, Bowen, McKinley & Norton, LLP

(57) ABSTRACT

A blade-fold bushing system includes a splined bushing comprising a first plurality of teeth, a castellated bushing comprising a second plurality of teeth and a shaft portion configured to coaxially fit within the splined bushing, and a lock bushing coaxially aligned with the castellated bushing. A support tool for use with a blade-fold bushing system includes an outer head comprising a third plurality of teeth configured to mesh with the first plurality of teeth of the splined bushing, and an inner head comprising a fourth plurality of teeth configured to mesh with the second plurality of teeth of the castellated bushing.

17 Claims, 10 Drawing Sheets

SEMI-AUTOMATIC ROTOR BLADE FOLD MECHANISM

BACKGROUND

This section provides background information to facilitate a better understanding of the various aspects of the disclosure. It should be understood that the statements in this section of this document are to be read in this light, and not as admissions of prior art.

Rotorcraft and tiltrotor aircraft are often transported or stored on vessels or in areas where storage space is limited. In order to reduce the space that each aircraft occupies such that a maximum number of aircraft can be accommodated within the limited storage space, rotor blade assemblies of some rotor systems can be folded so that each rotor blade is generally parallel with each other rotor blade in order to reduce the overall profile of the rotor assembly. Typically, each rotor blade is folded about a single pivot point positioned outboard of a yoke.

Some tiltrotor aircrafts utilize automated built-in systems to rotate or fold rotor blades into a collapsed position for storing the tiltrotor aircraft. Built-in systems rely on various components and mechanisms to automatically unlock and fold one or more rotor blades. Built-in systems, while functional, add weight and complexity to the rotor blade assemblies of the tiltrotor aircraft.

SUMMARY

A blade-fold bushing system includes a splined bushing comprising a first plurality of teeth, a castellated bushing comprising a second plurality of teeth and a shaft portion configured to coaxially fit within the splined bushing, and a lock bushing coaxially aligned with the castellated bushing.

A blade-fold bushing system includes a splined bushing comprising a first plurality of teeth, a castellated bushing comprising a second plurality of teeth and a shaft portion configured to coaxially fit within the splined bushing, a lock bushing coaxially aligned with the castellated bushing, and a support tool. The support tool includes an outer head comprising a third plurality of teeth configured to mesh with the first plurality of teeth of the splined bushing, and an inner head comprising a fourth plurality of teeth configured to mesh with the second plurality of teeth of the castellated bushing.

A method of assembling a blade-fold bushing system includes securing a splined bushing having a first plurality of teeth in a blade tang, securing a lock bushing in a grip, the lock bushing being coaxially located with the splined bushing, and inserting a castellated bushing into the splined bushing, the castellated bushing comprising a second plurality of teeth and a shaft portion configured to coaxially fit within the splined bushing.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
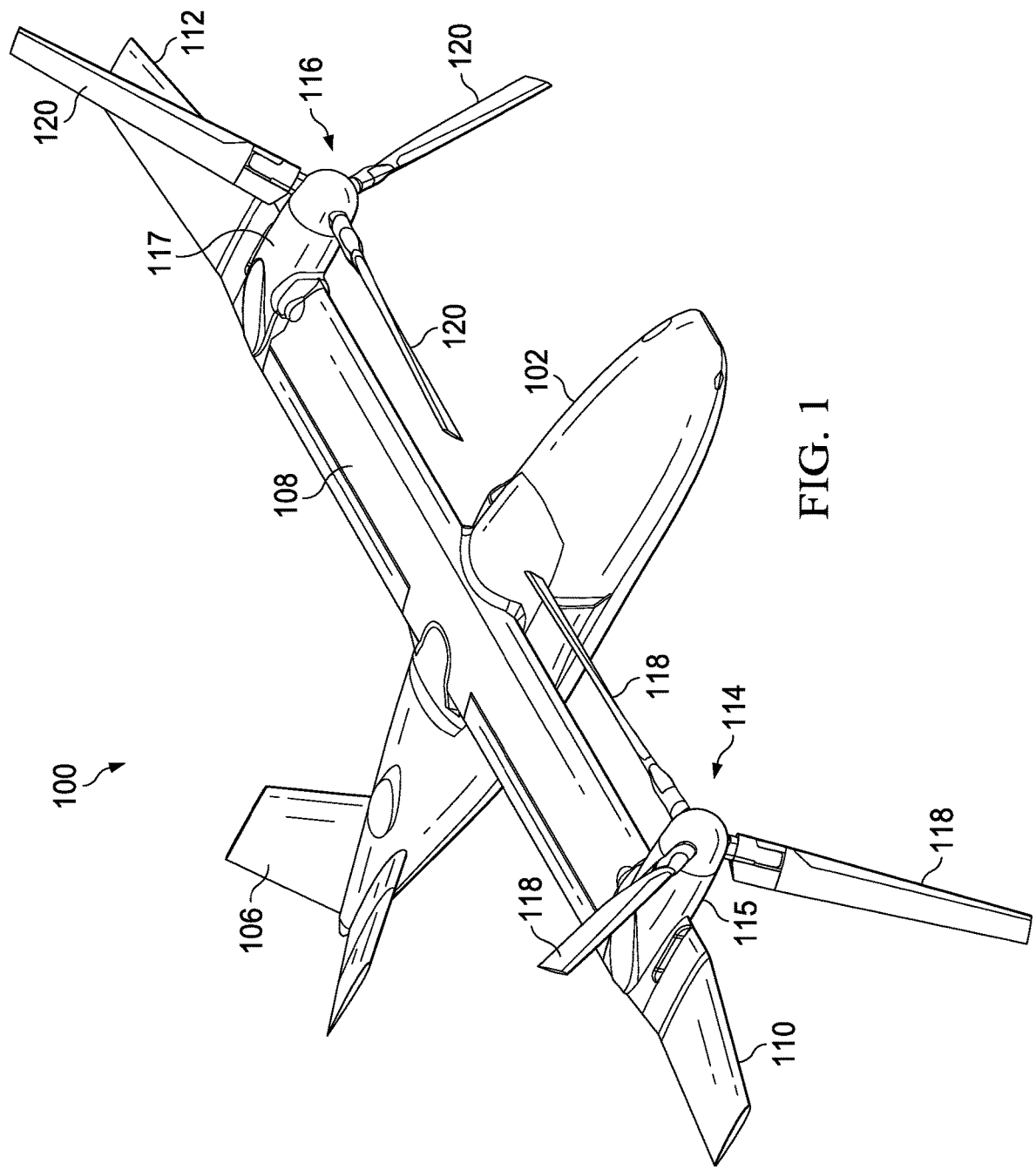
FIG. 1 is a perspective view of an exemplary tiltrotor aircraft configured in a flight ready position according to aspects of the disclosure.

It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed.

Figure 2:
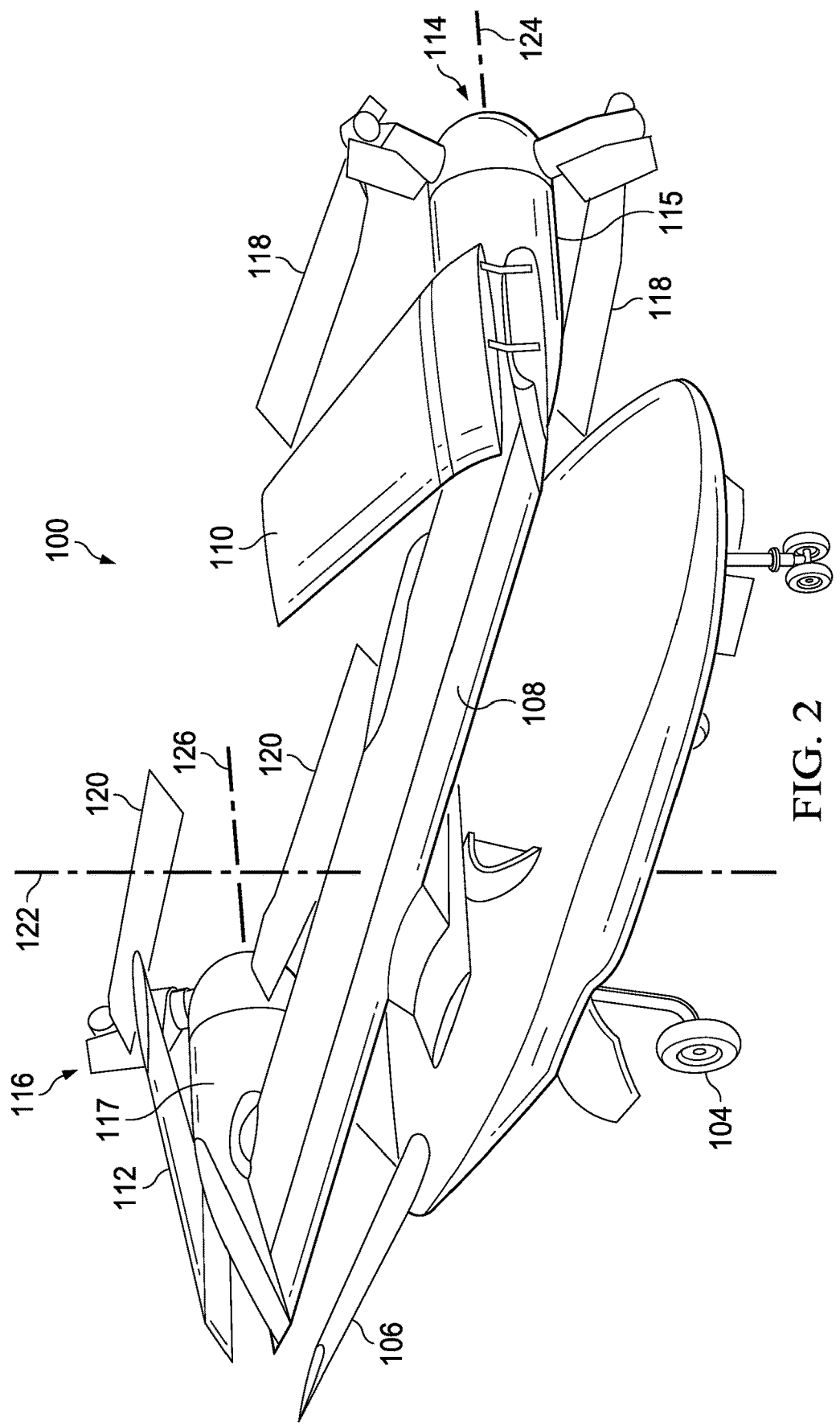
FIG. 2 is a perspective view of an exemplary tiltrotor aircraft configured in a stowed position according to aspects of the disclosure.

Referring to FIGS. 1 and 2, an exemplary tiltrotor aircraft 100 is shown. FIG. 1 is a perspective view of the tiltrotor aircraft 100 configured in a flight ready position and FIG. 2 is a perspective view of the tiltrotor aircraft 100 configured in a stowed position. The tiltrotor aircraft 100 includes a fuselage 102, landing gear 104, a tail member 106, a wing 108, a wing tip 110, a wing tip 112, a rotor system 114, and a rotor system 116. The rotor system 114 is housed within a nacelle 115 located on an end portion of the wing 108 that is proximal the wing tip 110. The rotor system 116 is housed within nacelle 117 located on an opposite end portion of the wing 108 that proximal the wing tip 112. The wing tip 110 is pivotable at a location on the wing 108 that is outboard the nacelle 115. The wing tip 112 is pivotable at a location on the wing 108 that is outboard the nacelle 117. Nacelles 115, 117 are pivotable between a helicopter mode where the rotor systems 114, 116 are generally vertical and an airplane mode where the rotor systems 114, 116 are generally horizontal. The nacelles 115, 117 are substantially symmetric relative to each other about the fuselage 102.

The rotor system 114 includes a plurality of foldable rotor blades 118 and the rotor system 116 includes a plurality of foldable rotor blades 120. The rotor blades 118, 120 may rotate in opposite directions to cancel torque associated with the operation of each rotor system 114, 116. An angle of the pivotable nacelles 115, 117 relative to the wing 108, as well as the pitch of rotor blades 118, 120, can be adjusted in order to selectively control direction, thrust, and lift of the tiltrotor aircraft 100. The rotor systems 114, 116 are illustrated in the context of the tiltrotor aircraft 100; however, a singular rotor system with foldable rotor blades can be implemented on other non-tilting rotor and helicopter rotor systems. It should also be appreciated that teachings relative to the tiltrotor aircraft 100 may apply to other aircraft such as airplanes and unmanned aircraft which would benefit from folding rotor blades.

The fuselage 102 represents a body of the tiltrotor aircraft 100 and may be coupled to the rotor systems 114, 116 such that the rotor systems 114, 116, along with the rotor blades 118, 120, may move tiltrotor aircraft 100 through the air. The landing gear 104 supports the tiltrotor aircraft 100 when the tiltrotor aircraft 100 is landing or when the tiltrotor aircraft 100 is at rest on the ground. FIG. 2 illustrates a vertical axis 122 that is generally perpendicular to a longitudinal axis 126 of the wing 108. An intersection of the vertical axis 122 and the longitudinal axis 126 is generally positioned at an intersection of the fuselage 102 and the wing 108. FIG. 1 represents tiltrotor aircraft 100 in flight ready position in an airplane mode. FIG. 2 represents tiltrotor aircraft 100 in a stowed position with the rotor blades 118 folded generally parallel to each other and the rotor blades 120 folded generally parallel to each other in order to reduce dimensions of the tiltrotor aircraft 100 to whatever degree is required in response storage space restrictions. In the stowed position, the wing 108 is swiveled approximately 90° to generally align with a length of the fuselage 102.

Referring to tiltrotor aircraft in general, each rotor system includes a mast driven by a power source (e.g., an engine or motor). Each rotor system also includes a yoke connected to the mast, with rotor blades indirectly connected to the yoke with bearings. The bearings may be, for example, elastomeric bearings constructed from a rubber type material that absorb vibration. The bearings may include inboard bearings connecting a cuff or grip of a rotor blade to the yoke proximate the mast and outboard bearings connecting the rotor blade to an outboard end of the yoke. The cuff or grip may be separate from the rotor blade or may be integrally formed with the rotor blade. Other combinations of inboard and outboard bearings with or without cuffs or grips are possible as well as the removal of one or the other of the bearings. The bearings accommodate forces acting on the rotor blades allowing each rotor blade to flex with respect to the yoke/mast and other rotor blades. The weight of the rotor blades and the lift of rotor blades generated by action of the rotor blades may result in transverse forces on the yoke and other components. Examples of transverse forces include forces resulting from flapping and coning of the rotor blades. Flapping can refer to an up-and-down movement of a rotor blade positioned at a right angle to the plane of rotation or can refer to a gimballing of the hub or a teetering rotor. Coning generally refers to an upward flexing of a rotor blade due to lift forces acting on the rotor blade. Generally speaking, the hub is not rigidly connected to the mast and a differential coning of the rotor blades can cause the hub to tilt relative to the mast.

The rotor blades may be subject to other forces, such as axial, lead/lag, and feathering forces. Axial forces generally refer to a centrifugal force on the rotor blades resulting from rotation of the rotor blades. Lead and lag forces generally refer to forces resulting from a horizontal movement of the rotor blades about a vertical pin that occur if, for example, the rotor blades do not rotate at the same rate as the yoke. Feathering forces generally refer to forces resulting from twisting motions that cause a rotor blade to change pitch. The power source, mast, and yoke are components for transmitting torque. The power source may include a variety of components including an engine, a transmission, and differentials. In operation, the mast receives torque from the power source and rotates the yoke. Rotation of the yoke causes the rotor blades to rotate with the mast and yoke.

Figure 3:
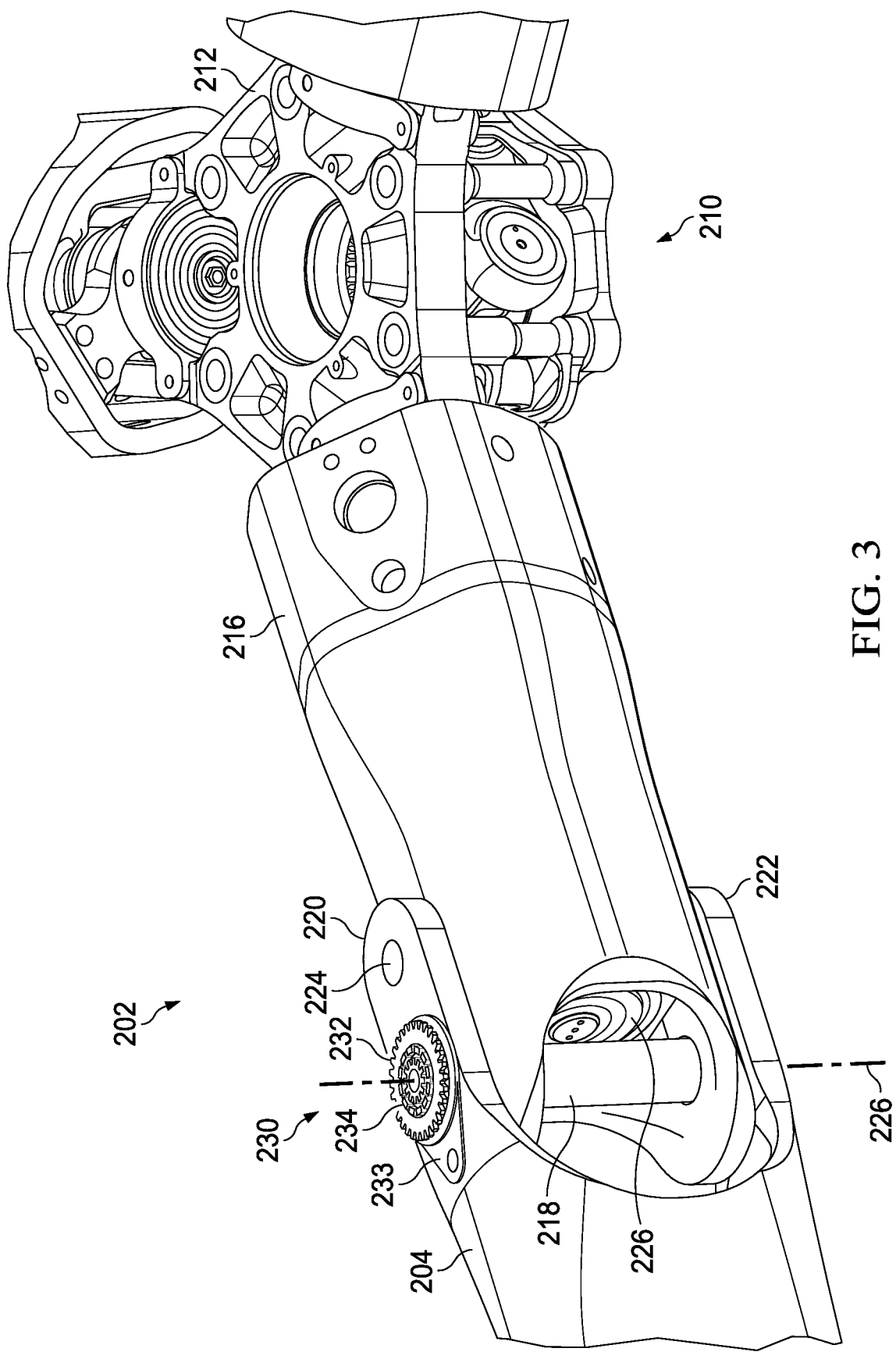
FIG. 3 is a partial perspective view of a rotor assembly according to one or more aspects of the disclosure.
Figure 4:
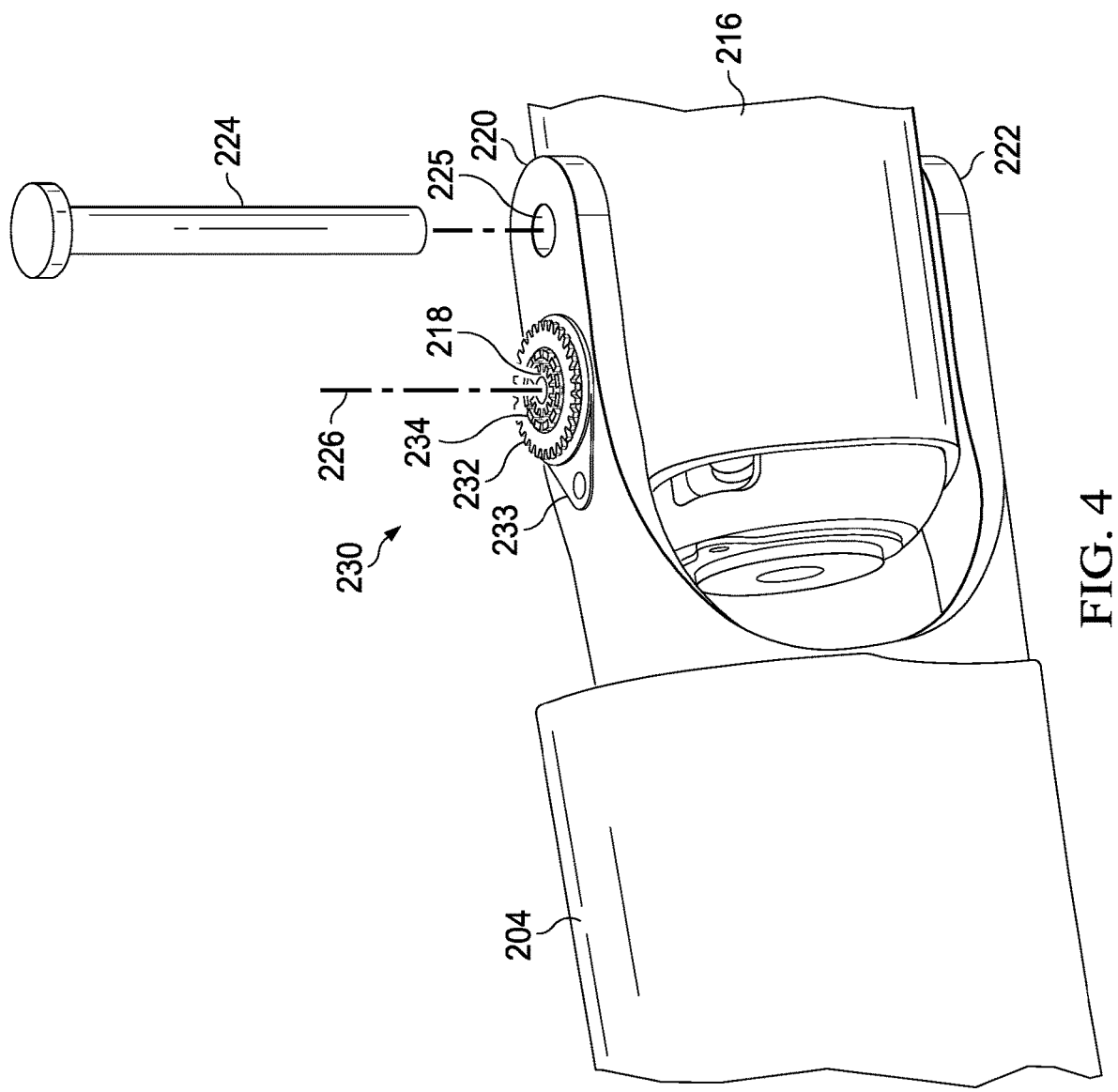
FIG. 4 is a close-up view of a blade-fold bushing system.
Figure 5:
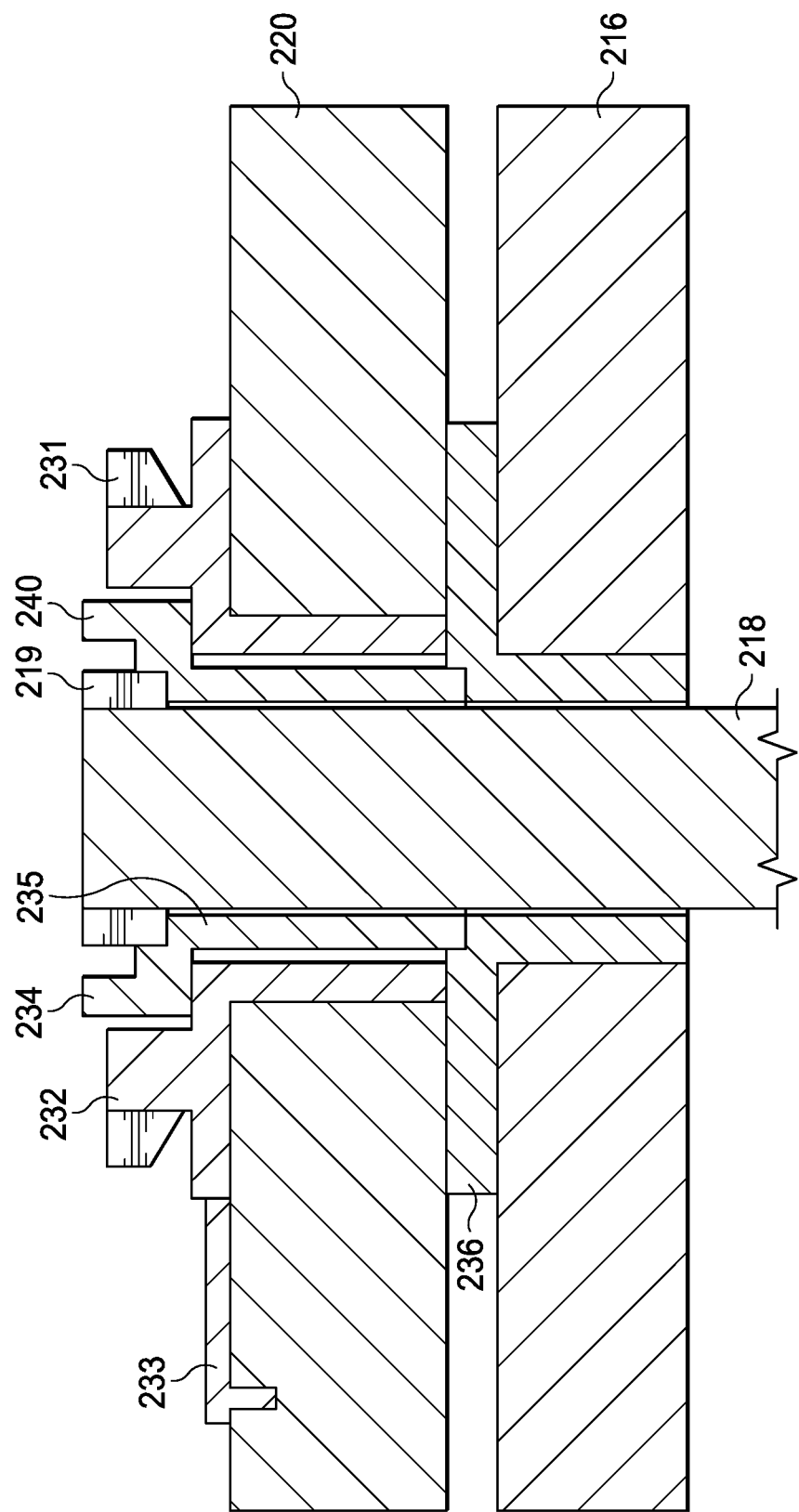
FIG. 5 is a cross-sectioned side view of the blade-fold bushing system of FIG. 4.

Referring to FIGS. 3-5, a rotor assembly 202 is shown. FIG. 3 is a partial perspective view of rotor assembly 202 in an unfolded position. FIG. 4 is a close-up view of a blade-fold bushing system 230. FIG. 5 is a cross-sectional side view of the blade-fold bushing system 230. Each rotor system 114, 116 comprises a separate rotor assembly 202. In the interest of clarity, a single rotor assembly 202 is described herein with the understanding that tiltrotor aircraft 100 comprises a pair of similarly configured rotor assemblies 202. The rotor assembly 202 includes three rotor blades 204. In exemplary embodiments, rotor blades 204 are similar to rotor blades 118, 120. In the unfolded position, each rotor blade 204 is generally equally spaced from each other rotor blade 204 around a yoke 212. For example, in the three rotor blade configuration shown in FIGS. 3-5, approximately 120° separates each rotor blade 204. It should also be appreciated that teachings regarding rotor assembly 202 can apply to rotor assemblies 202 having greater or fewer rotor blades 204.

Yoke 212 is mounted to a hub spring assembly 210. In the interest of clarity, a single connection between the yoke 212 and one rotor blade 204 is described herein with the understanding that rotor assembly 202 comprises a similarly configured connection for each yoke 212 and rotor blade 204 interface. Rotor blade 204 is connected to yoke 212 via a grip 216. In an exemplary embodiment, grip 216 is connected to yoke 212 by an inboard bearing assembly. The inboard bearing assembly may include one or more bearings to support loads that are exerted on yoke 212 by rotor blade 204 when rotor blade 204 rotates about yoke 212. For example, the inboard bearing assembly may include one or more of an inboard shear bearing and an inboard centrifugal force ("CF") bearing. Rotor blade 204 is connected to grip 216 via a blade-fold bolt 218 that passes through blade tangs 220, 222 of rotor blade 204. Blade-fold bolt 218 transfers centrifugal force loads to grip 216, which are further transferred to yoke 212 by grip 216. A pin 224 locks rotor blade 204 in place relative to grip 216 and prevents rotor blade 204 from pivoting about blade-fold bolt 218 during flight (e.g., see FIG. 3). Pin 224 is shown in FIG. 4 as withdrawn from hole 225. To fold rotor blade 204, pin 224 is removed from hole 225 to disengage pin 224 from blade tangs 220, 222. In some embodiments, pin 224 is removed manually (e.g., by a person servicing the aircraft). In some embodiments, pin 224 may be automatically removed by a mechanism on tiltrotor aircraft 100. With pin 224 removed, rotor blade 204 can pivot about central axis 226 of blade-fold bolt 218.

In an exemplary embodiment, a swash plate is connected to the mast. Pitch links extend from the swash plate to pitch horns that are coupled to the grips 216. The swash plate, pitch links, and pitch horns are operatively connected to an actuator to pitch the rotor blades 204 relative to the yoke 212 in a first direction about a central longitudinal axis of each rotor blade 204. The central longitudinal axis may also be referred to as a blade pitch change axis. Each rotor blade 204 is free to rotate or "pitch" about its central longitudinal axis with respect to the yoke 212 in a range between 0° and 90°.

Rotor assembly 202 includes blade-fold bushing system 230. Blade-fold bushing system 230 includes a splined bushing 232, a castellated bushing 234, and a lock bushing 236 (best seen in FIGS. 5-8). FIG. 5 shows a sectioned side view of blade-fold bushing system 230. Splined bushing 232 includes teeth 231 and is attached to blade tang 220. Splined bushing 232 rotates with blade tang 220. In some embodiments, splined bushing 232 is secured to blade tang 220 via an adhesive. In some embodiments, splined bushing 232 includes a support tab 233 that anchors splined bushing 232 to blade tang 220. Support tab 233 provides an additional fixation point to provide additional engagement between splined bushing 232 and blade tang 220. In some embodiments, splined bushing 232 is secured to blade tang 220 via adhesive and support tab 233.

Figure 6:
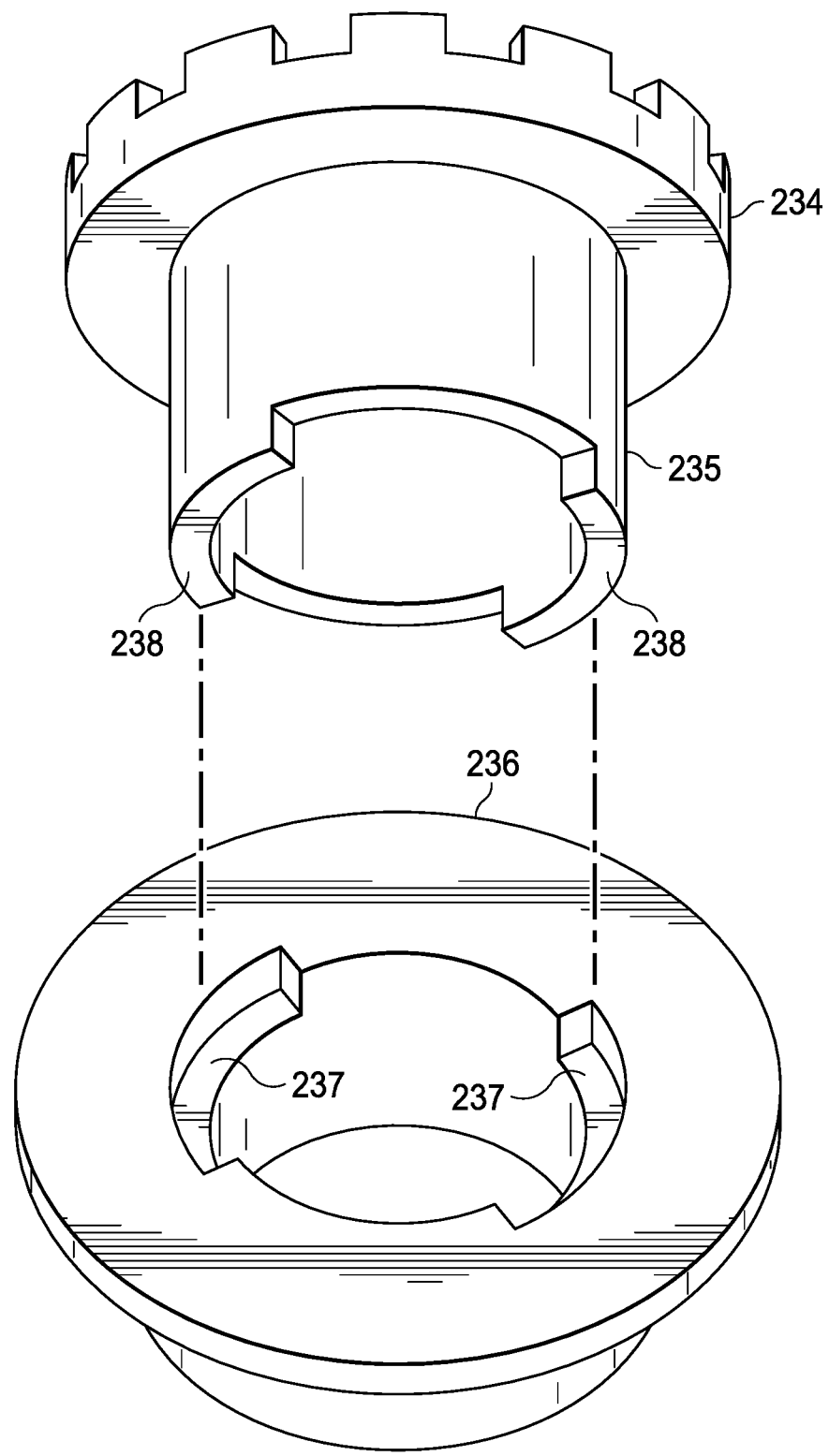
FIG. 6 provides additional views of components of the blade-fold bushing system.

FIG. 6 provides additional views of castellated bushing 234 and lock bushing 236. Castellated bushing 234 includes a shaft portion 235 that is configured to be coaxially located within the splined bushing 232 as illustrated in FIGS. 3-8. A top portion of castellated bushing 234 includes teeth 240 and a bottom of castellated bushing includes extended portions 238. Castellated bushing 234 is indirectly attached to grip 216 via lock bushing 236 and blade-fold bolt 218. Lock bushing 236 is attached to grip 216 and does not rotate relative to grip 216. Lock bushing 236 may be attached to grip 216 via adhesives and the like. In some embodiments, lock bushing 236 includes one or more recesses 237 that receive extended portions 238 of castellated bushing 234 to provide a positive engagement between lock bushing 236 and castellated bushing 234. With extended portions 238 engaged with recesses 237, castellated bushing 234 is locked in place relative to grip 216 and does not rotate. In some embodiments, castellated bushing 234 includes blade-fold bolt teeth 239 that are configured to mesh with teeth 219 of blade-fold bolt 218.

Figure 7:
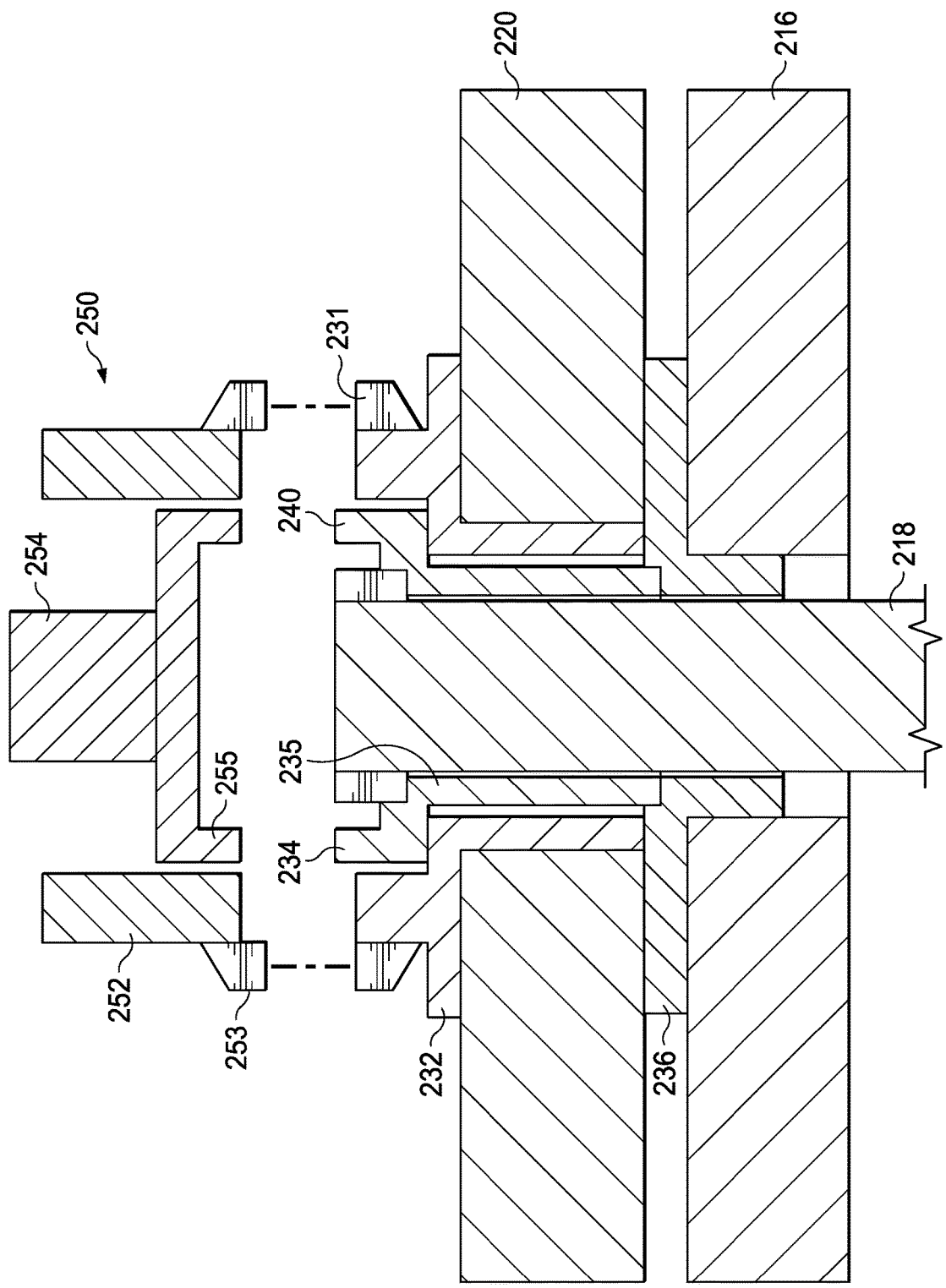
FIG. 7 is a view of a support tool aligned with the blade-fold bushing system.

Referring now to FIG. 7, a support tool 250 for rotating rotor blade 204 is shown. FIG. 7 shows support tool 250 positioned above blade-fold bushing system 230. Support tool 250 includes an outer head 252 and an inner head 254. Outer head 252 includes teeth 253 that are configured to engage teeth 231 of splined bushing 232. Inner head 254 includes teeth 255 that are configured to engage teeth 240 of castellated bushing 234. Support tool 250 includes a motor configured to rotate outer head 252 relative to inner head 254. In some embodiments, inner head 254 is stationary relative to a handle or body of support tool 250 and outer head 252 is selectively rotated by the motor in counter-clockwise or clockwise directions. In some embodiments, the motor is configured to rotate outer head 252 and inner head 254 in opposite directions. For example, if outer head 252 is rotating in a clockwise direction, inner head 254 rotates in a counter-clockwise direction, and vice versa. It will be recognized by those of skill in the art that the various teeth disclosed herein could be replaced with other types of engagements, such as, for example, a key and keyway, mating splines, mating geometric shapes, and the like.

Figure 8:
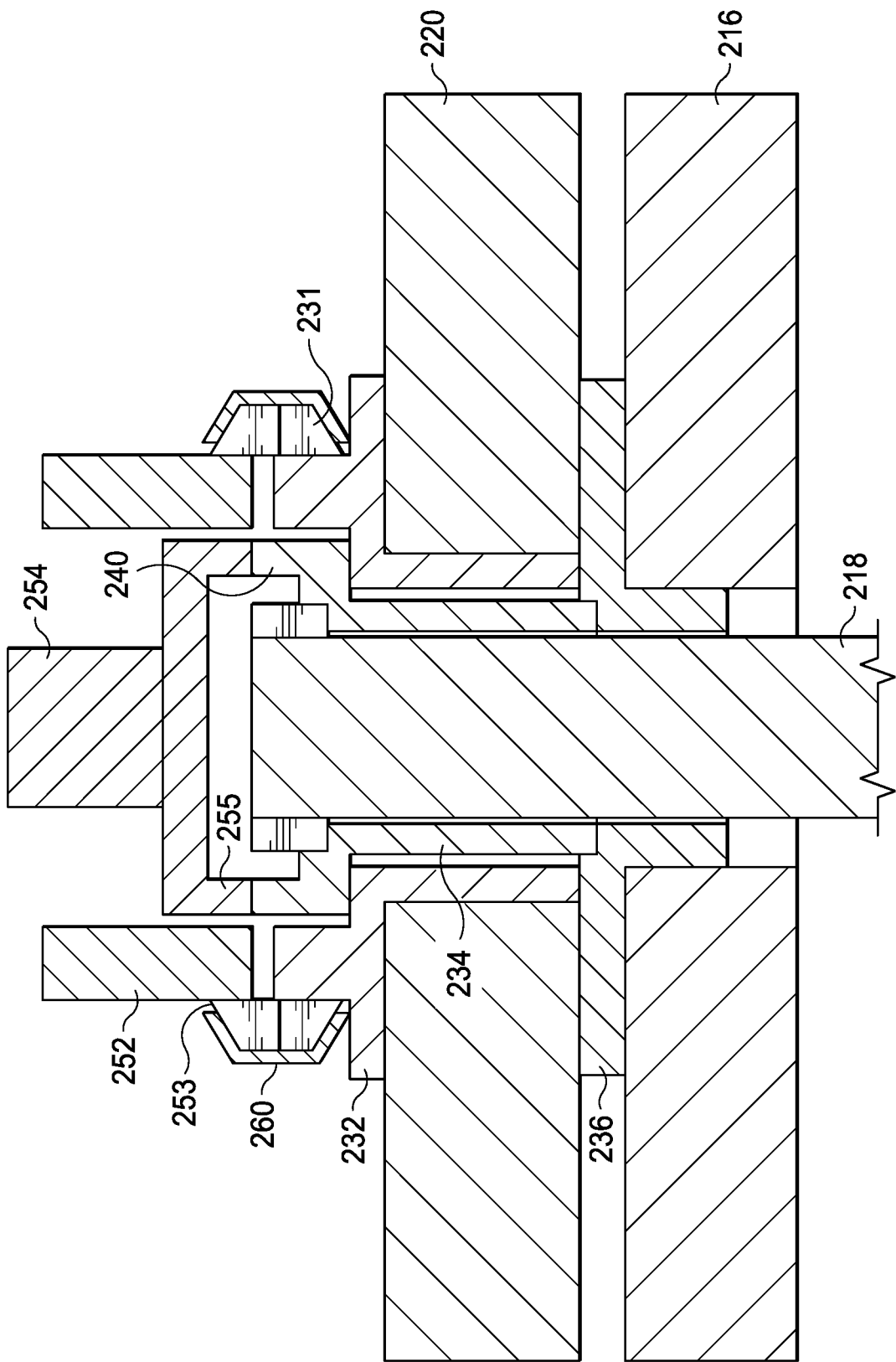
FIG. 8 is a view of the folding tool of FIG. 7 engaged with the blade-fold bushing system.

Referring now to FIG. 8, support tool 250 is shown engaged with blade-fold bushing system 230. Support tool 250 engages blade-fold bushing system 230 by pressing support tool 250 onto blade-fold bushing system 230 so that teeth 253 engage teeth 231 and teeth 255 engage teeth 240. Once support tool 250 is engaged with blade-fold bushing system 230, the motor of support tool 250 can be powered on to rotate rotor blade 204 in a desired direction. In some embodiments, support tool 250 may be secured to blade-fold bushing system 230. For example, a v-band clamp 260 may be positioned as illustrated in FIG. 8. V-band clamp 260 engages with a sloped face 262 of splined bushing 232 and a sloped face of 264 of outer head 252. In some embodiments, support tool 250 is secured to blade-fold bushing system 230 and remains secured thereto while aircraft 100 is stored. In these embodiments, multiple support tools 250 may be utilized to rotate multiple rotor blades 204. In some embodiments, support tool 250 can act as a brake that holds rotor blade 204 in a desired position of rotation.

Figure 9:
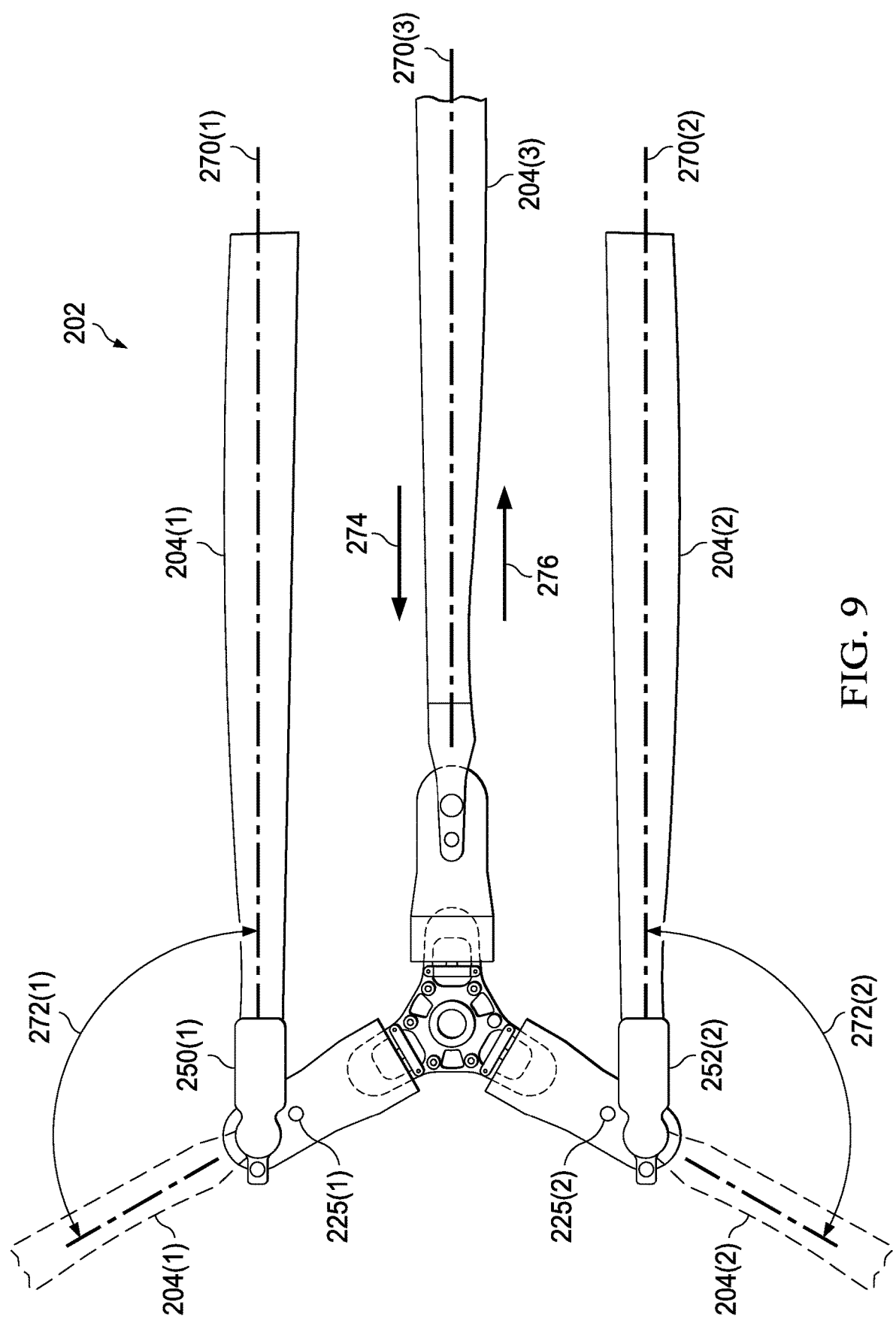
FIG. 9 is a view of a rotor assembly in a folded position.

Referring to FIG. 9, rotor assembly 202 is shown in a folded position. Rotor assembly 202 includes rotor blades 204(1), 204(2), and 204(3). Rotor blades 204(1) and 204(2) are shown in a folded position with support tools 250(1) and 250(2) secured to rotor blades 204(1) and 204(2), respectively. Rotor blade 204(3) is shown in an unfolded position. Unfolded rotor blades 204(1) and 204(2) are depicted in shadow. Rotor blade 204(1) has central longitudinal axis 270(1) and rotor blade 204(2) has central longitudinal axis 270(2). Rotor blade 204(1) may be rotated about an arc 272(1) that illustrates an angle through which the rotor blade 204(1) may rotate. Rotor blade 204(2) may be rotated about an arc 272(2) that illustrates an angle through which the rotor blade 204(2) may rotate. Rotor blades 204(1), 204(2) pivot about central axis 226 of their respective blade-fold bolt 218. Support tools 250(1), 250(2) facilitate rotational movement of rotor blades 204(1), 204(2). Arcs 272(1), 272(2) may be in the range of 90° to 180°. In some embodiments, physical stops or proximity sensors may be used to signal support tools 250(1), 250(2) to cease rotational movement of rotor blades 204(1), 204(2). In some embodiments, support tools 250(1), 250(2) are operated by user who controls rotation of rotor blades 204(1), 204(2). In some embodiments, support tools 250(1), 250(2) may be operated by a control system that is remote from the support tools 250(1), 250(2).

Rotor blade 204(1) is prevented from rotating until pin 224(1) has disengaged hole 225(1). Similarly, rotor blade 204(2) is prevented from rotating until pin 224(2) has disengaged hole 225(2). An inboard direction 274 points, with respect to each unfolded rotor blade 204, toward the yoke 212 of the rotor assembly 202 and an outboard direction 276 points, with respect to each unfolded rotor blade 204, away from the yoke 212.

Figure 10:
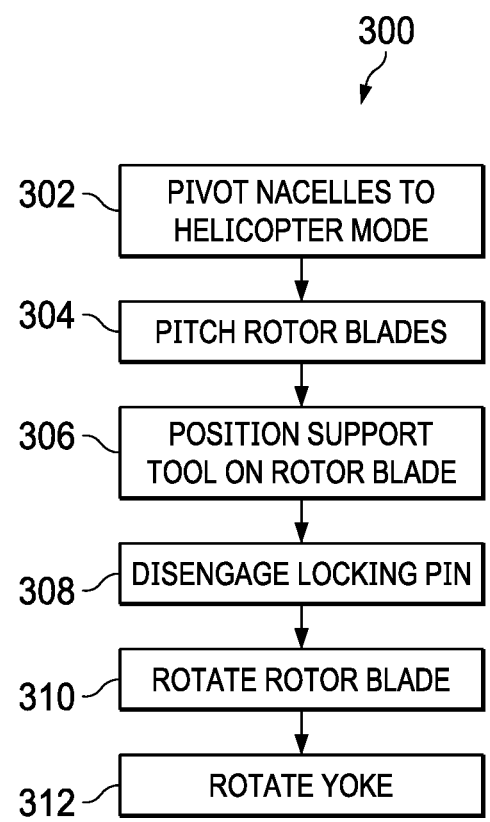
FIG. 10 is a flowchart illustrating actions performed in an exemplary method of converting a tiltrotor aircraft from a flight ready position to a stowed position according to aspects of the disclosure.

FIG. 10 is a flow chart illustrating a method 300 of converting tiltrotor aircraft 100 from a flight ready position to a stowed position. FIG. 10 will be discussed relative to FIGS. 1-9. At block 302, nacelles 115, 117, which house rotor systems 114, 116, respectively, are pivoted to airplane mode with rotor blades 204 oriented in the inverted-Y position (i.e., with one rotor blade 204 pointing straight up). In airplane mode, each nacelle 115, 117 is rotated to a nacelle angle of approximately 0° relative to the ground. Each nacelle 115, 117 is at an angle of approximately 0° when the longitudinal axis of each nacelle 115, 117 is generally parallel to the ground. With nacelles 115, 117 at an angle of approximately 0°, each rotor assembly 202 of each rotor system 114, 116 is oriented generally perpendicular relative to the ground.

At block 304, each rotor blade 204 of the rotor systems 114, 116 is pitched about its central longitudinal axis 270 to a high collective position in which a leading edge of each rotor blade 204 is generally facing forward. Pitching the rotor blades 204 in this way is referred to as indexing the rotor blades. Pitch-horn actuators operatively connected to the pitch horns facilitate the change in pitch of the rotor blades 204. Pitching rotor blades 204 into this position orients blade-fold bushing systems 230 of each rotor blade 204 to face generally forward.

At block 306, support tool 250(1) is coupled to blade-fold bushing system 230 of rotor blade 204(1) and support tool 250(2) is coupled to blade-fold bushing system 230 of rotor blade 204(2). In some embodiments, each support tool 250(1), 250(2) is secured to its respective blade-fold bushing system 230 by v-band clamp 260.

At block 308, each to-be-folded rotor blade 204 (e.g., rotors 204(1) and 204(2) of FIG. 9) is unlocked by disengaging pin 224 from hole 225. In some embodiments, pin 224 is removed by an actuator operatively connected to pin 224. In some embodiments, pin 224 is disengaged from hole 225 manually (e.g., by support personnel). The position and quantity of to-be-folded rotor blades can vary depending on rotor assembly configuration (e.g., the embodiment of FIG. 6 illustrates that two of the three rotor blades are folded).

At block 310, support tools 250(1), 250(2) rotate each to-be-folded rotor blade 204(1), 204(2) to the folded position. In an exemplary embodiment, rotor blades 204(1)-(3) start in the inverted-Y position with rotor blade 204(1) and rotor blade 204(2) forming arms of the inverted Y and rotor blade 204(3) extending upward to form the tail of the inverted Y. Support tool 250(1) rotates rotor blade 204(1) up toward rotor blade 204(3). In some embodiments, rotor blade 204(1) is rotated to be generally parallel with rotor blade 204(3). Support tool 250(2) rotates rotor blade 204(2) up toward rotor blade 204(3). In some embodiments, rotor blade 204(2) is rotated to be generally parallel with rotor blade 204(3). In some embodiments, physical stops or proximity sensors are used that signal that support tools 250(1), 250(2) should cease movement of the rotor blades 204(1), 204(2) when rotor blades 204(1), 204(2) have reached a desired folded position.

At block 312, after rotor blades 204(1) and 204(2) have been rotated, yoke 212 is rotated to reorient rotor blades 204(1)-(3) to a desired position. For example, yoke 212 may be rotated so that rotor blades 204(1)-(3) are generally parallel with wing 108 (e.g., similar to FIG. 2).

Method 300 can be interrupted or stopped at any point to facilitate maintenance. It is to be understood that several of the actions of method 300 may occur simultaneously or in different order. In some embodiments, some actions may not be performed. The order of actions of method 300 is not meant to be limiting.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," "generally," and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A blade-fold bushing system comprising:
   a splined bushing comprising a first plurality of teeth;
   a castellated bushing comprising a second plurality of teeth and a shaft portion configured to coaxially fit within the splined bushing;
   a lock bushing coaxially aligned with the castellated bushing; and
   wherein:
   the lock bushing is configured to engage the castellated bushing and extend through a grip coupled to a rotor blade;
   the shaft portion of the castellated bushing comprises an extended portion; and
   the lock bushing comprises a recess configured to receive the extended portion and prevent rotation of the castellated bushing relative to the lock bushing.

2. The blade-fold bushing system of claim 1, wherein the splined bushing further comprises a support tab configured to connect to the rotor blade.

3. The blade-fold bushing system of claim 1, wherein the splined bushing further comprises a sloped face configured to work with a v-band clamp.

4. The blade-fold bushing system of claim 1, wherein the castellated bushing further comprises blade-fold bolt teeth that are configured to mesh with teeth of a blade-fold bolt.

5. A blade-fold bushing system comprising:
   a splined bushing comprising a first plurality of teeth;
   a castellated bushing comprising a second plurality of teeth and a shaft portion configured to coaxially fit within the splined bushing;
   a lock bushing coaxially aligned with the castellated bushing;
   a support tool comprising:
     an outer head comprising a third plurality of teeth configured to mesh with the first plurality of teeth of the splined bushing; and
     an inner head comprising a fourth plurality of teeth configured to mesh with the second plurality of teeth of the castellated bushing; and
   wherein;
   the lock bushing is configured to engage the castellated bushing and extend through a grip coupled to a rotor blade;
   the shaft portion of the castellated bushing comprises an extended portion; and
   the lock bushing comprises a recess configured to receive the extended portion and prevent rotation of the castellated bushing relative to the lock bushing.

6. The blade-fold bushing system of claim 5, wherein the outer head is configured to rotate in clockwise and counterclockwise directions.

7. The blade-fold bushing system of claim 5, wherein the inner head and the outer head are configured to rotate in opposite directions.

8. The blade-fold bushing system of claim 5, further comprising:
   a v-band clamp;
   wherein the splined bushing comprises a sloped face configured to mate with the v-band clamp; and
   wherein the outer head comprises a sloped face configured to mate with the v-band clamp.

9. The blade-fold bushing system of claim 5, wherein the splined bushing further comprises a support tab configured to connect to the rotor blade.

10. The blade-fold bushing system of claim 5, wherein the castellated bushing further comprises blade-fold bolt teeth that are configured to mesh with teeth of a blade-fold bolt.

11. A method of assembling a blade-fold bushing system, the method comprising:

securing a splined bushing in a blade tang, the splined bushing comprising a first plurality of teeth;

securing a lock bushing in a grip, the lock bushing being coaxially located with the splined bushing; and inserting a castellated bushing into the splined bushing;

wherein:

the castellated bushing engages the lock bushing and comprises a second plurality of teeth and a shaft portion configured to coaxially fit within the splined bushing;

the castellated bushing comprises an extended portion on a bottom of the shaft portion; and the lock bushing comprises a recess configured to receive the extended portion and prevent rotation of the castellated bushing relative to the lock bushing.

12. The method of claim 11, further comprising inserting a blade-fold bolt into the castellated bushing to secure the castellated bushing to the lock bushing.

13. The method of claim 11, wherein the splined bushing further comprises a support tab configured to connect to a rotor blade.

14. The method of claim 11, wherein the splined bushing further comprises a sloped face configured to work with a v-band clamp.

15. The method of claim 11, wherein the castellated bushing further comprises blade-fold bolt teeth that are configured to mesh with teeth of a blade-fold bolt.

16. The method of claim 11, wherein the lock bushing is secured to the grip via adhesive.

17. The method of claim 11, wherein the splined bushing is secured to the blade tang via adhesive.

* * * * *